US007085679B2

(12) United States Patent
Dobell et al.

(10) Patent No.: US 7,085,679 B2
(45) Date of Patent: Aug. 1, 2006

(54) USER INTERFACE ADAPTED FOR PERFORMING A REMOTE INSPECTION OF A FACILITY

(75) Inventors: Colin Dobell, Ottawa (CA); Michael Tooker, Montreal (CA)

(73) Assignee: Certicom Security, Dallas, TX (US)

( * ) Notice: Subject to any disclaimer, the term of this patent is extended or adjusted under 35 U.S.C. 154(b) by 0 days.

(21) Appl. No.: 10/958,661

(22) Filed: Oct. 6, 2004

(65) Prior Publication Data

US 2006/0074592 A1 Apr. 6, 2006

(51) Int. Cl.
*G06F 15/00* (2006.01)

(52) U.S. Cl. ......................................... 702/182; 700/38

(58) Field of Classification Search ................ 702/182, 702/179, 189, 181–183, 188; 700/38, 44, 700/282, 108

See application file for complete search history.

(56) References Cited

U.S. PATENT DOCUMENTS

| | | | | |
|---|---|---|---|---|
| 4,962,473 | A | 10/1990 | Crain | |
| 5,553,609 | A | 9/1996 | Chen et al. | |
| 6,405,675 | B1 | 6/2002 | Mills | |
| 6,606,117 | B1 | 8/2003 | Windle | |
| 6,757,008 | B1 * | 6/2004 | Smith | 348/143 |
| 2002/0097322 | A1 | 7/2002 | Monroe et al. | |
| 2002/0170064 | A1 * | 11/2002 | Monroe et al. | 725/105 |
| 2002/0175931 | A1 | 11/2002 | Holtz et al. | |
| 2004/0143602 | A1 * | 7/2004 | Ruiz et al. | 707/104.1 |

OTHER PUBLICATIONS

Computerized Monitoring Services / Remote Watchmen http://www.cmsn.com/services_new_remotevideo.html (Available since at least: Feb. 10, 2004).

* cited by examiner

*Primary Examiner*—Edward Raymond
(74) *Attorney, Agent, or Firm*—Ogilvy Renault LLP

(57) ABSTRACT

A method and apparatus are disclosed for performing an evaluation of the quality of performance of a service involving a person at a remote facility. The method comprises providing a user interface; viewing, on the user interface, a moving video representative of a station showing the person; and using a tool displayed on the user interface, the tool for collecting data regarding the quality of performance of a service in accordance with the video.

19 Claims, 14 Drawing Sheets

USER INTERFACE ADAPTED FOR PERFORMING A REMOTE INSPECTION OF A FACILITY

CROSS-REFERENCE TO RELATED APPLICATIONS

This is the first application filed for the present invention.

TECHNICAL FIELD

This invention relates to the field of user interfaces. More precisely, this invention pertains to a user interface adapted for performing an assessment of a service being provided at a remote facility.

BACKGROUND OF THE INVENTION

U.S. Pat. No. 5,553,609, entitled "Intelligent remote visual monitoring system for health care service", relates to a method for performing a monitoring of a plurality of patients. The system comprises a supervisory control center having access to patient and health care professional databases for assigning patients to appropriate health care professionals and for performing task planning. A number of master monitoring computers are linked to the control center and are accessible by a corresponding number of health care professionals. A slave monitoring computer is located within the homes of a plurality of patients.

Unfortunately, such system does not enable an operator to perform an efficient evaluation of the quality of performance of a service.

International Patent Application WO 02101503, entitled "Caching graphical interface for displaying video and ancillary data from a saved video", discloses a method for obtaining a selectable image from a stored image database. Unfortunately such reference does not provide a tool for performing an evaluation of a service.

There is a need for a method that will overcome at least one of the above-identified drawbacks.

SUMMARY OF THE INVENTION

According to an aspect of the invention, there is provided a method for performing an evaluation of the quality of performance of a service involving a person at a remote facility, the method comprising providing a user interface, viewing, on the user interface, a moving video representative of a station showing the person and using a tool displayed on the user interface, the tool for collecting data regarding the quality of performance of a service in accordance with the video.

In this specification, the term "station" is intended to mean "a physical location and point of view of interest in the remote premise comprising at least one human provider of the service in question".

Furthermore, the term "survey" is intended to mean a tool for structuring the gathering of specific information about performance of a service at a set of similar remote locations. Each survey is a unique pre-defined combination of a) stations to be observed at the remote location, b) information to be gathered at each station, and c) techniques to be used to facilitate the gathering of information at each station. A user may develop multiple surveys to address different assessment objectives. A single location may be used observed at different times using multiple surveys.

The term "tour" is intended to mean an instance of a survey executed at one or more stations.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF AN EMBODIMENT

Figure 1:
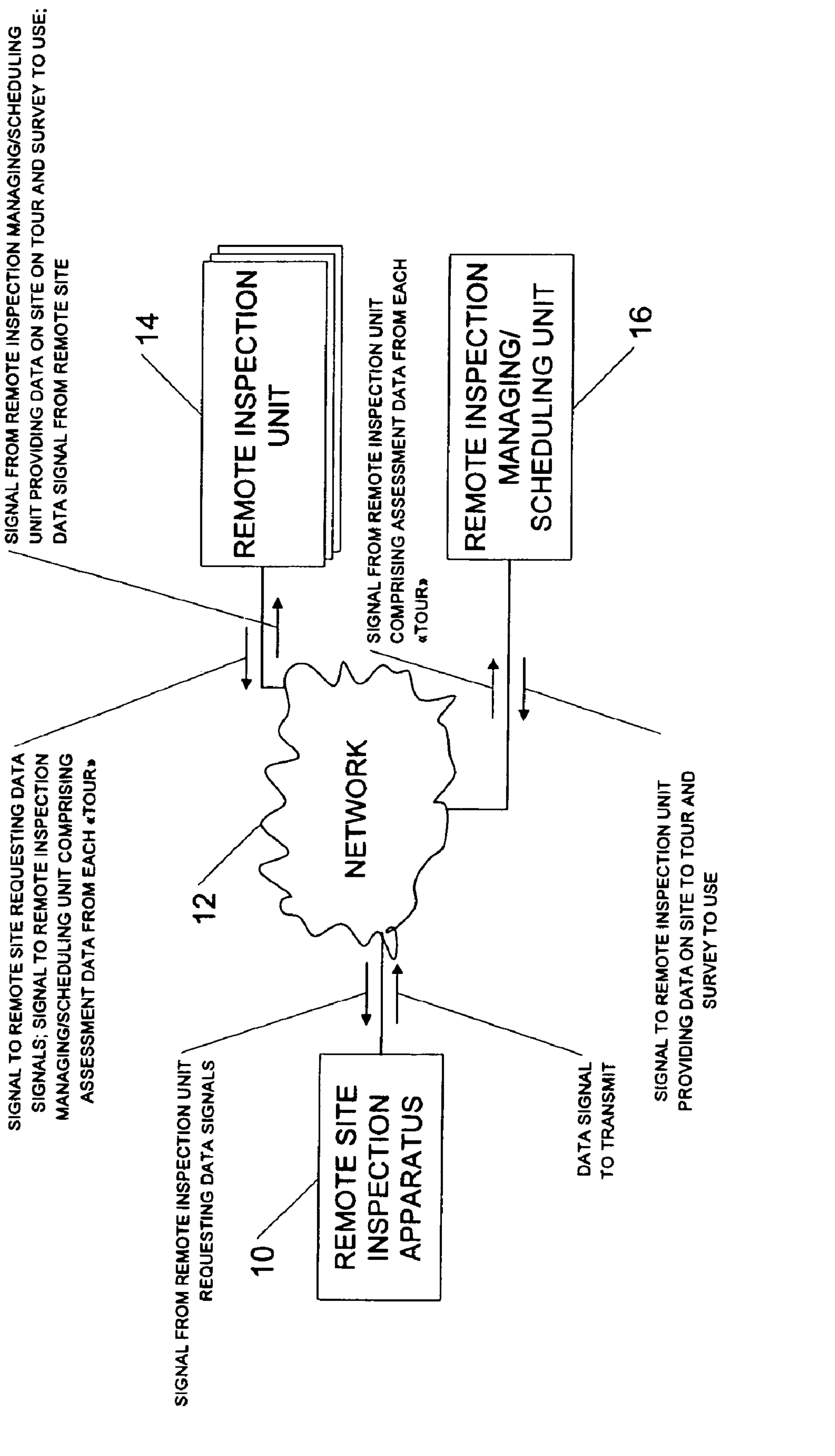
FIG. 1 is a block diagram showing an embodiment of the invention where a remote inspection unit is scheduled by a remote inspection managing/scheduling unit to perform a remote inspection of a remote site.

FIG. 1 shows an embodiment of the invention disclosing how a remote site is inspected.

In this embodiment, the remote inspection managing/scheduling unit 16 schedules at least one remote inspection unit 14, of a plurality of remote inspection units 14 available, to perform a remote inspection of a remote site using a remote site inspection apparatus 10 using a specified "survey".

The remote inspection managing/scheduling unit 16 is connected to the plurality of remote inspection units 14 and to remote site inspection apparatus 10 via a network 12 which is preferably a packet-switched Wide Area Network (WAN), such as the Internet.

Alternatively, the network 12 may be any one of a Metropolitan Area Network (MAN) and a Local Area Network (LAN). It will be appreciated that the network 12 may be accessed using dial-up connection, a broadband connection or the like.

The skilled addressee will appreciate that each of the remote inspection managing/scheduling unit 16, the plurality of remote inspection units 14 and the remote site inspection apparatus 10 is uniquely identified in the network 12 using an identifier which is dependent on the protocol that is used.

At a predetermined time prior to the scheduled inspection, the remote inspection managing/scheduling unit 16 provides a signal to a remote inspection unit 14 providing data on site to tour and survey to use. The signal designates the remote inspection to be performed by at least one remote inspection unit 14 and further specifies to that unit a network address of the remote site as well as a survey to be used during the remote inspection and a configuration to be used for the remote inspection as explained below.

In one embodiment, the remote inspection assigning signal is provided via email.

The remote inspection unit of the plurality of remote inspection units 14, to which the remote inspection assigning signal is provided, receives the signal from the remote inspection managing/scheduling unit providing data on the site to tour and the survey to use and provides a signal to the remote site inspection apparatus 10 requesting data signals for performing an inspection of the remote site. In an embodiment, the signal to the remote site inspection apparatus 10 requesting data signals for performing an inspection of the remote site is provided to the remote site inspection apparatus 10 using email or an in-advance FTP file transfer.

Alternatively, a user located at the remote inspection unit 14 may decide spontaneously to schedule/reschedule an inspection activity based on touring experience during a particularly day or set of days. In such case, the user logs on the remote inspection managing/scheduling unit 16 via the network 12 and then enters or modifies his touring activity. After logging off, a new signal comprising data on site to tour and survey to use is sent to the remote inspection unit 14. Alternatively, an authorized operator may have an access to the remote inspection unit 14 and may then be able to spontaneously generate a schedule of touring activities for himself using a survey format as well as site equipment configuration information that has already been provided by the remote inspection managing/scheduling unit 16 at an earlier time and stored at the remote inspection unit 14. In such case, a material change would be preferably communicated back to the remote inspection managing/scheduling unit 16.

Alternatively, no signal is provided to the remote site inspection apparatus 10 requesting data signals. In such case, a data signal to transmit is continuously broadcasted by the remote site inspection apparatus 10. This data signal could a) be used by the remote site inspection apparatus 10 to perform its inspection, b) be stored on a storage medium at the remote site inspection apparatus for later use in performing its inspection, or c) be stored on a storage medium located at some other location connected to a network, from which it could be used at some later time by the remote inspection unit in performing its inspection.

The apparatus 10 for performing an inspection of the remote site provides a data signal to transmit to the remote inspection unit of the plurality of remote inspection units 14 which has initiated the remote inspection of that site via the network 12. The data signal to transmit is generated by the remote site inspection apparatus 10 in response to a prompt or instructions transmitted to it from time to time by the remote inspection unit 14. In one embodiment, the data signal is encrypted prior its transmission over the network 12.

The selected remote inspection unit performs the remote inspection and provides, via the network 12, a signal to the remote inspection managing/scheduling unit 16 comprising assessment data from each “tour”. The signal comprising assessment data from each “tour” is received by the remote inspection managing/scheduling unit 16 and may be used as explained further below.

Figure 2:
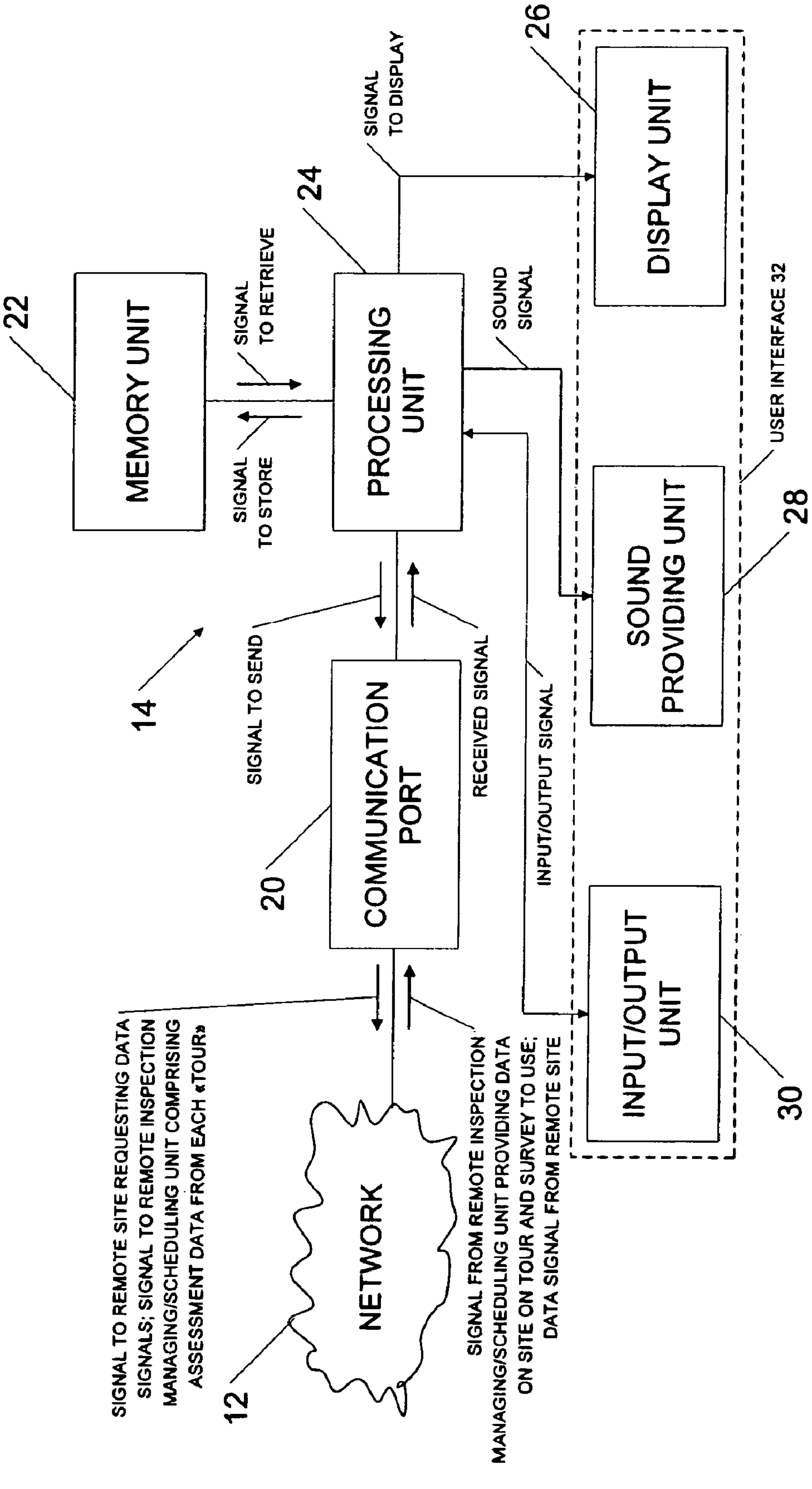
FIG. 2 is a block diagram showing an embodiment of a remote inspection unit.

Now referring to FIG. 2, there is shown an embodiment of a remote inspection unit 14.

The remote inspection unit 14 comprises a communication port 20, a processing unit 24, a memory unit 22, and a user interface 32. The user interface 32 comprises a display unit 26, a sound providing unit 28 and an input/output unit 30.

The communication port 20 is used in order to provide a connection to the network 12. The skilled addressee will appreciate that the communication port 20 is selected in accordance with the type of network 12 and the processing unit 24. In an embodiment, the communication port comprises an xDSL interface. It should be understood that various types of communication ports may be used.

The user interface 32 is for providing data to an operator which will use it to perform the remote inspection of at least one station as explained below. The user interface 32 is further used to collect an input/output signal provided preferably by the operator either in response to the data provided to the user interface 32 or in an effort to modify or control the signal being provided by the remote inspection apparatus 14.

More precisely, the user interface 32 comprises a display unit 26 and a sound providing unit 28 to which the data is provided. Furthermore, the user interface 32 comprises an input/output unit 30 used for collecting a feedback from the operator in response to the data provided as explained further below. In an embodiment, the display unit 26 comprises a video card and a screen (not shown) for the displaying of the station under inspection.

Still in this embodiment, the sound providing unit 28 comprises a sound card and at least one speaker compatible therewith.

In an embodiment, the input/output unit 30 comprises at least one of a keyboard and a mouse for advantageously providing information as explained below. Alternatively, a touch screen may be used.

The remote inspection unit 14 further comprises a memory unit 22 for storing a data signal from the remote site as well as the results from an executed tour. In an embodiment, the memory unit 22 comprises a Random Access Memory (RAM). The skilled addressee should be able to select a proper type and size for the memory unit 22. The latter should also appreciate that a hard drive may also be advantageously used. Alternatively, the data signal from the remote site as well as the result from an executed tour may be stored centrally in a remote location on the network 12.

In fact, it should be understood that the remote inspection unit 14 may be comprised in a computer adapted to be connected to the network 12 running an operating system such as Microsoft™ Windows™. Alternatively, a custom-build computer designed to collect data and forward the data with minimum processing may be used.

More precisely, the communication port 20 receives the signal from the network 12. This data signal comprises at least one of the signal from the remote inspection managing/scheduling unit providing data on the site to tour and on the survey to use, the data signal from the remote site inspection apparatus and the data signal from a data storage unit elsewhere on the network 12 (which had been previously used to store the data signal from the remote site).

The communication port 20 provides at least one part of the data signal to the processing unit 24. The at least one part of the data signal may be stored in the memory unit 22 for a future use. The data signal comprises a signal indicative of a video for at least one of the plurality of stations at the remote site. Moreover, the data signal may further comprise a signal indicative of a sound for at least one of the plurality of stations. Furthermore, and in the case where sensor units are used for performing the inspection, the data signal may comprise a signal indicative of data provided by the sensor units.

The processing unit 24 processes the data signal and provides a signal for display by the display unit 40 as well as a sound signal to be played by the sound signal providing unit 42. The processing is performed in order to provide the data to the operator in an advantageous way, as explained below.

The operator from time to time provides an input/output signal via the input/output unit 30. The input/output signal depends on the data signal discussed above and on a list of items to be observed, assessed and commented upon as further explained below.

The processing unit 24 collects the input/output signals provided by the input/output unit 30 which corresponds to all the sequence of views dictated by the survey. This unique collection of data is collected in a file at the end of the tour which contains all assessment input provided by the operator during the tour. After completion of the tour, the processing unit 24 provides a signal to send to the communication port 20. The signal to send is intended to be transmitted to the remote inspection managing/scheduling unit 16 for data collection storage, processing, formatting and reporting for delivery to users as explained below. The processing unit 24 may also store at least one part of the signal to send in the memory unit 22 as explained above.

The communication port 20 receives the signal to send and transmits a signal to the remote inspection managing/scheduling unit 16 comprising assessment data from each tour via the network 12.

Figure 3:
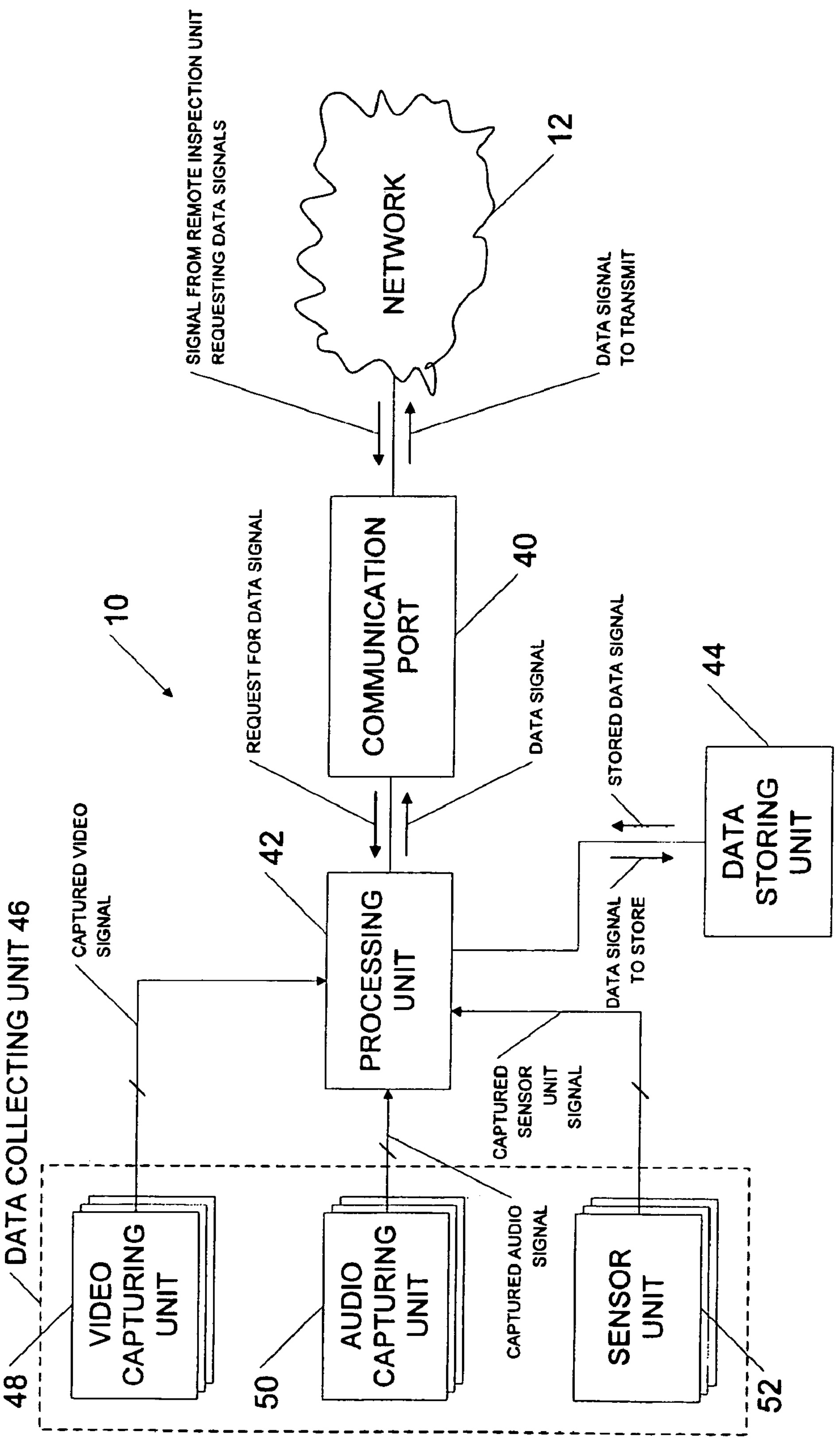
FIG. 3 is a block diagram showing an embodiment of a remote site inspection apparatus.

Now referring to FIG. 3, there is shown an embodiment of the remote site inspection apparatus 10 for performing an inspection of the remote site.

In one embodiment, the remote site inspection apparatus 10 comprises a data collecting unit 46, a processing unit 42, a communication port 40 and a data storing unit 44.

Still in this embodiment, the data collecting unit 46 comprises a plurality of video capturing units 48, a plurality of audio capturing units 50 and a plurality of sensor units 52. At this point it should be appreciated that each of the plurality of video capturing units 48, the plurality of audio capturing units 50 and the plurality of sensor units 52 are used to inspect a selected station of the remote site as explained further below.

Still in this embodiment, the plurality of video capturing units 48 comprises digital video acquisition units.

The plurality of audio capturing units 50 comprises a plurality of microphones.

The plurality of sensor units 52 comprises at least one sensor selected from the group consisting of temperature sensors, pressure sensors, RFID sensors, proximity sensors, motion sensors, weight sensors, or other relays which produce signals based on inputs received from third party computer devices. The skilled addressee should appreciate that the plurality of sensor units 52 are used to complete information provided by the plurality of video capturing units 48.

Still in this embodiment, the processing unit 42 is selected from a group consisting of Field Programmable Gate Area (FPGA), Digital Signal Processor (DSP), dedicated processor such as those manufactured by Intel™, AMD™, Motorola™ or the like. The skilled addressee will further appreciate that the processing unit 42 is selected according to various criteria such as the type of data collecting unit 46, etc.

The communication port 40 is used to provide a connection to the network 12. The skilled addressee will appreciate that the communication port 40 is selected in accordance with the type of network 12 and the processing unit 42. The communication port 40 may be selected for instance from a group consisting of wireless modems (wherein the wireless connection may be provided using as cellular, WirelessLAN, PCS or satellite), xDSL modem, PSTN modem or the like. In an embodiment, the communication port 40 comprises a xDSL modem and similar throughput capable systems. As explained previously, it should be understood that various types of communication ports may be used.

More precisely, the communication port 40 receives, from the network 12, a signal from the remote inspection unit requesting data signals and provides a request for data signal to the processing unit 42. The request for data signal is indicative of the specified video capturing unit, the specified audio capturing unit and the specified sensor unit assigned with the station to be observed at any time.

The processing unit 42 receives the request for data signal and collects a captured video signal, provided by at least one of the plurality of video capturing units 48, a captured audio signal, if specified, provided by at least one of the plurality of audio capturing units 50, and a captured sensor unit signal, if specified, provided by at least one of the plurality of sensor units 52.

The processing unit 42 generates a data signal comprising the captured video signal, the captured audio signal and the captured sensor unit signal if required.

The generated data signal is provided to the communication port 40 which creates a data signal to transmit, adapted to be transmitted over the network 12.

Alternatively, the optional data storing unit 44 may be provided at the remote site inspection apparatus 10 in order to store at least one part of the generated data signal, the captured video signal, the captured sensor unit signal and the captured audio signal. In another embodiment, the optional data storing unit 44 may be provided at any remote location on the network 12.

It should also be appreciated that each unit of the data collecting unit 46 may be located at a remote location on the network 12.

The skilled addressee will also appreciate that units such as a display unit and a user interface unit have not been shown in FIG. 3 for sake of clarity. Such units may be advantageously used at the remote site inspection apparatus 10 in order to operate the remote site inspection apparatus 10.

Figure 4:
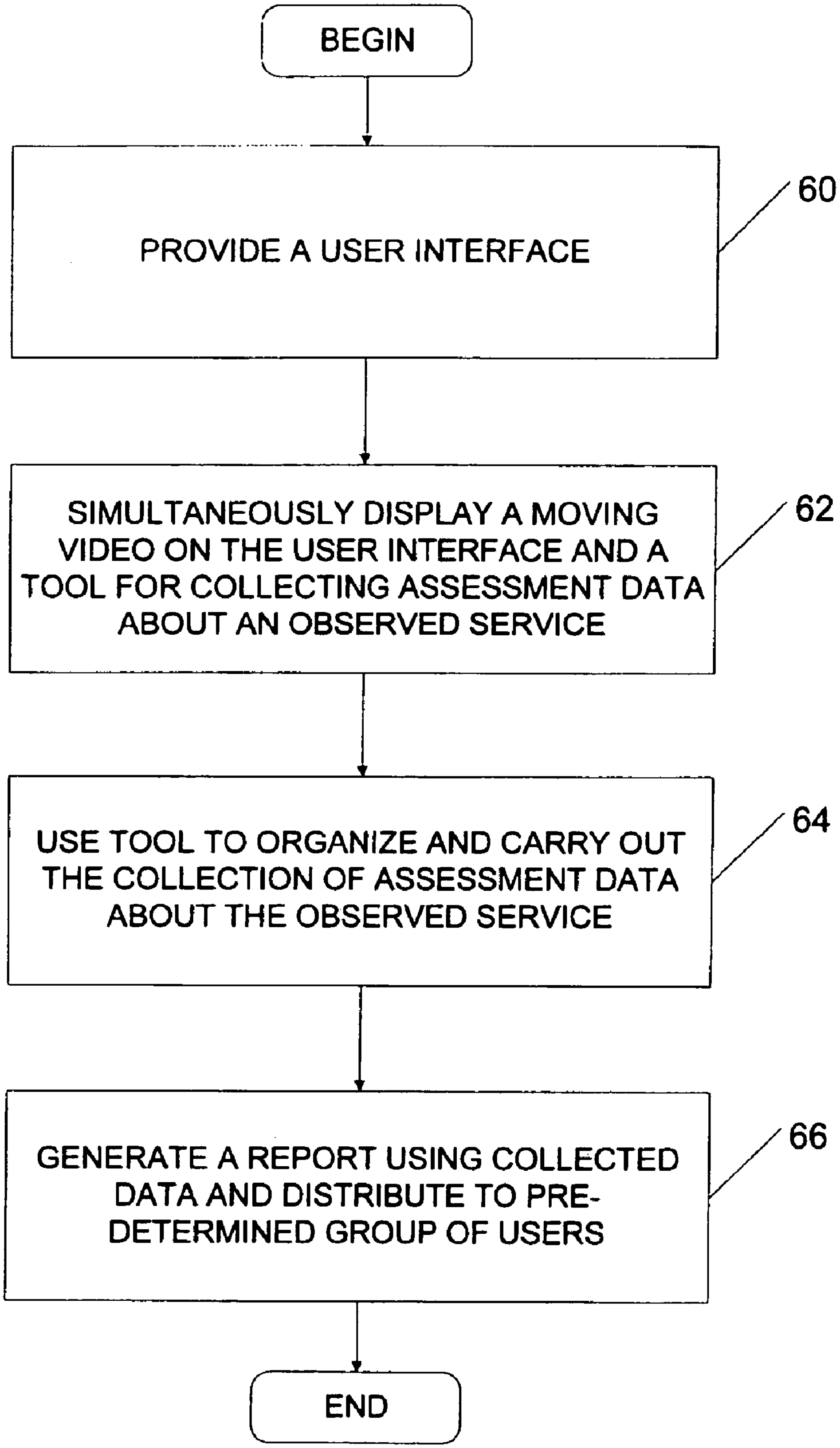
FIG. 4 is a flowchart showing an embodiment of a method for performing a remote inspection; a user interface is provided, a moving video is displayed on the user interface; a tool is used to collect assessment data about an observed service; and a report is generated and distributed using the collected data.

Now referring to FIG. 4, there is shown how a remote inspection is performed according to an embodiment.

According to step 60, a user interface is provided to an operator.

According to step 62, a moving video is simultaneously displayed on the user interface together with a tool for collecting assessment data about an observed service.

According to step 64, the tool is used to organize and carry out the collection of assessment data about the observed service.

According to step 66, a report is generated using collected data and is further distributed to a pre-determined group of users.

Figure 5:
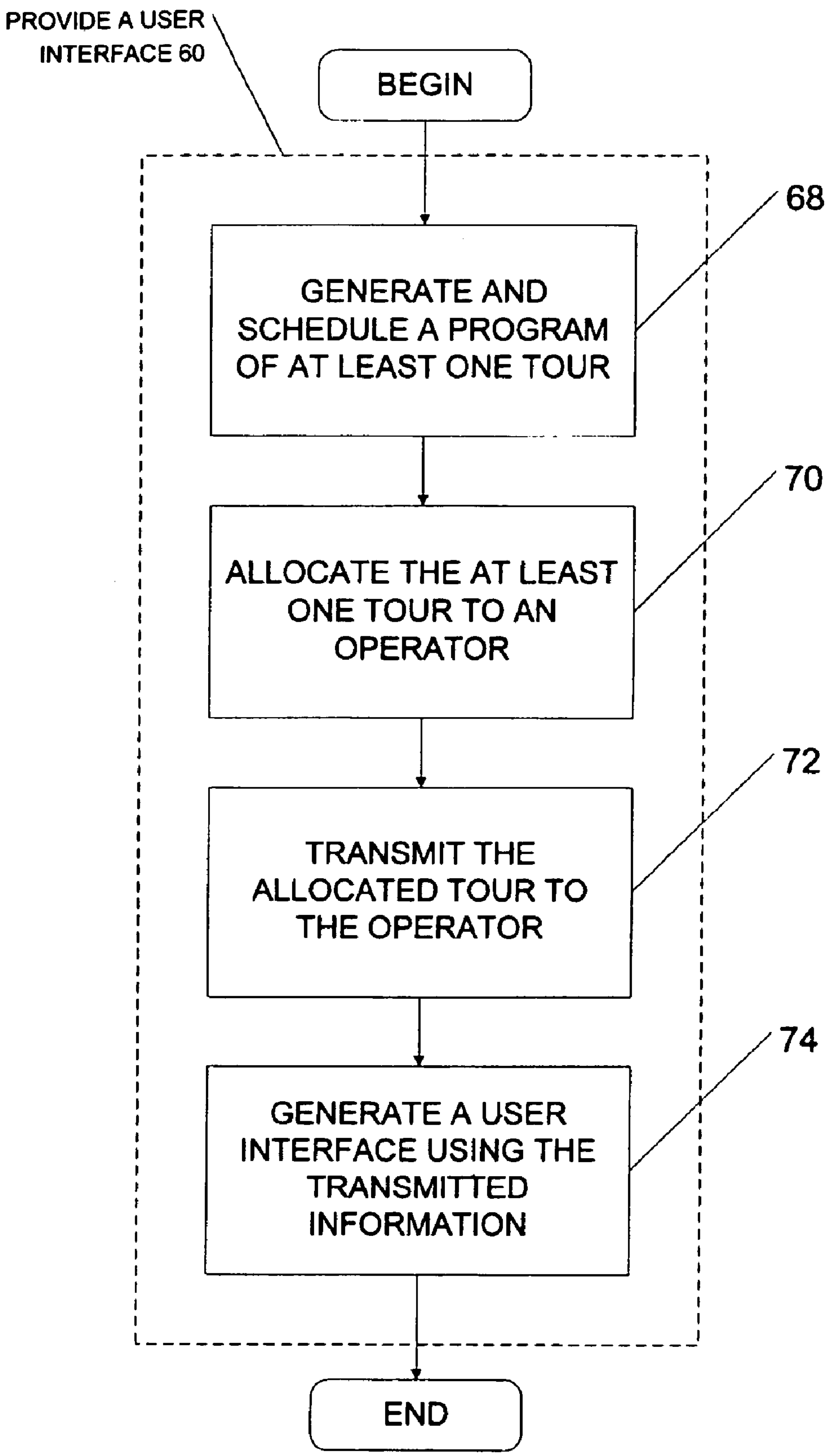
FIG. 5 is a flowchart showing an embodiment of a method for providing a user interface at the remote inspection unit.

Now referring to FIG. 5, there is shown how the user interface is provided (step 60).

According to step 68 a program of at least one tour is generated and scheduled. The program of at least one tour is generated by the remote inspection managing/scheduling unit 16.

Figure 6:
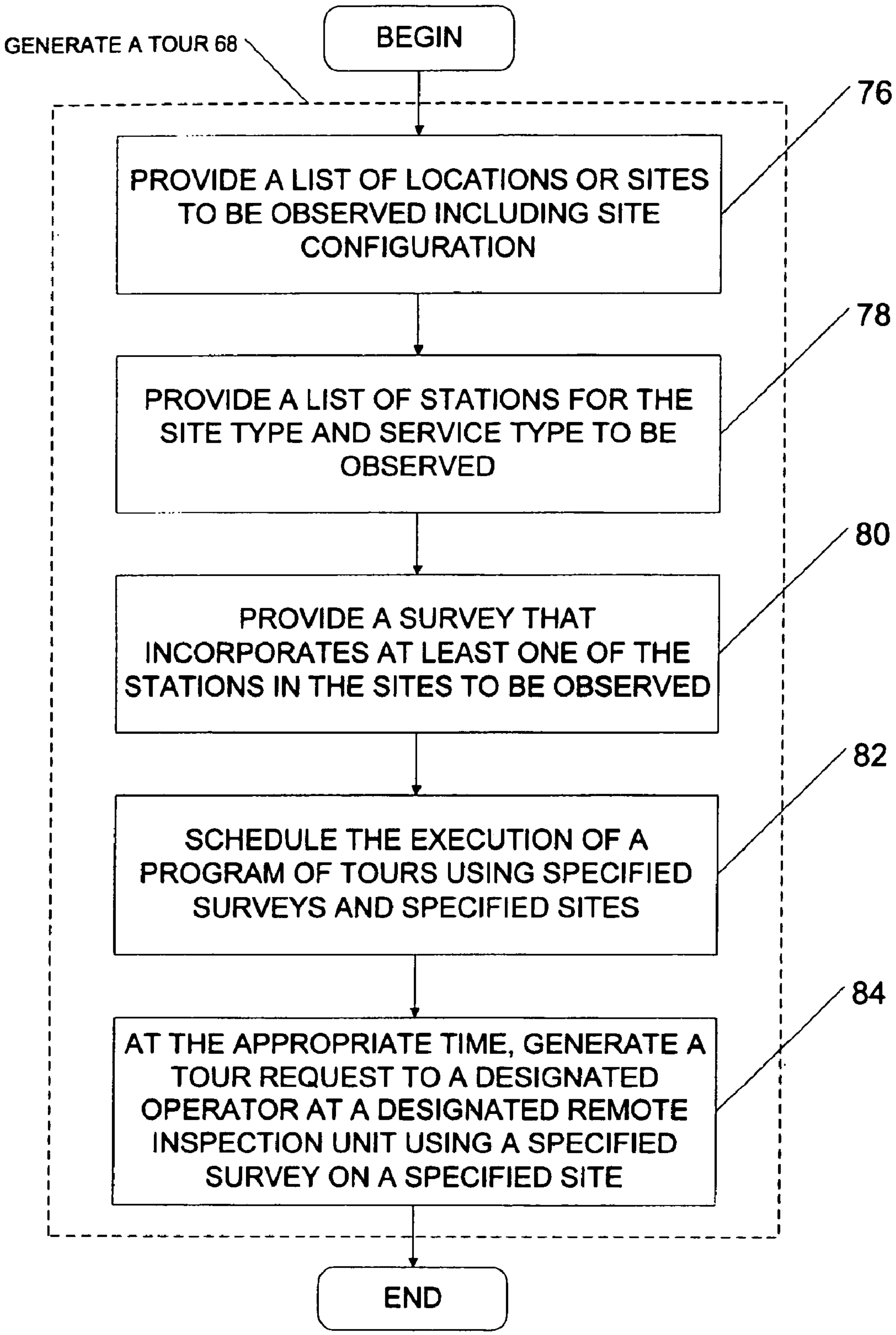
FIG. 6 is a flowchart showing an embodiment of a method for generating a tour.

Referring to FIG. 6, there is shown how the program of at least one tour is generated and scheduled.

According to step 76, a list of locations or sites to be observed including site configuration is provided. In one embodiment, the list of locations or sites to be observed including site configuration is provided to the remote inspection managing/scheduling unit 16 which then allocates tours based on an algorithm.

According to step 78, a list of stations for the site type and service type to be defined is provided.

Figure 7:
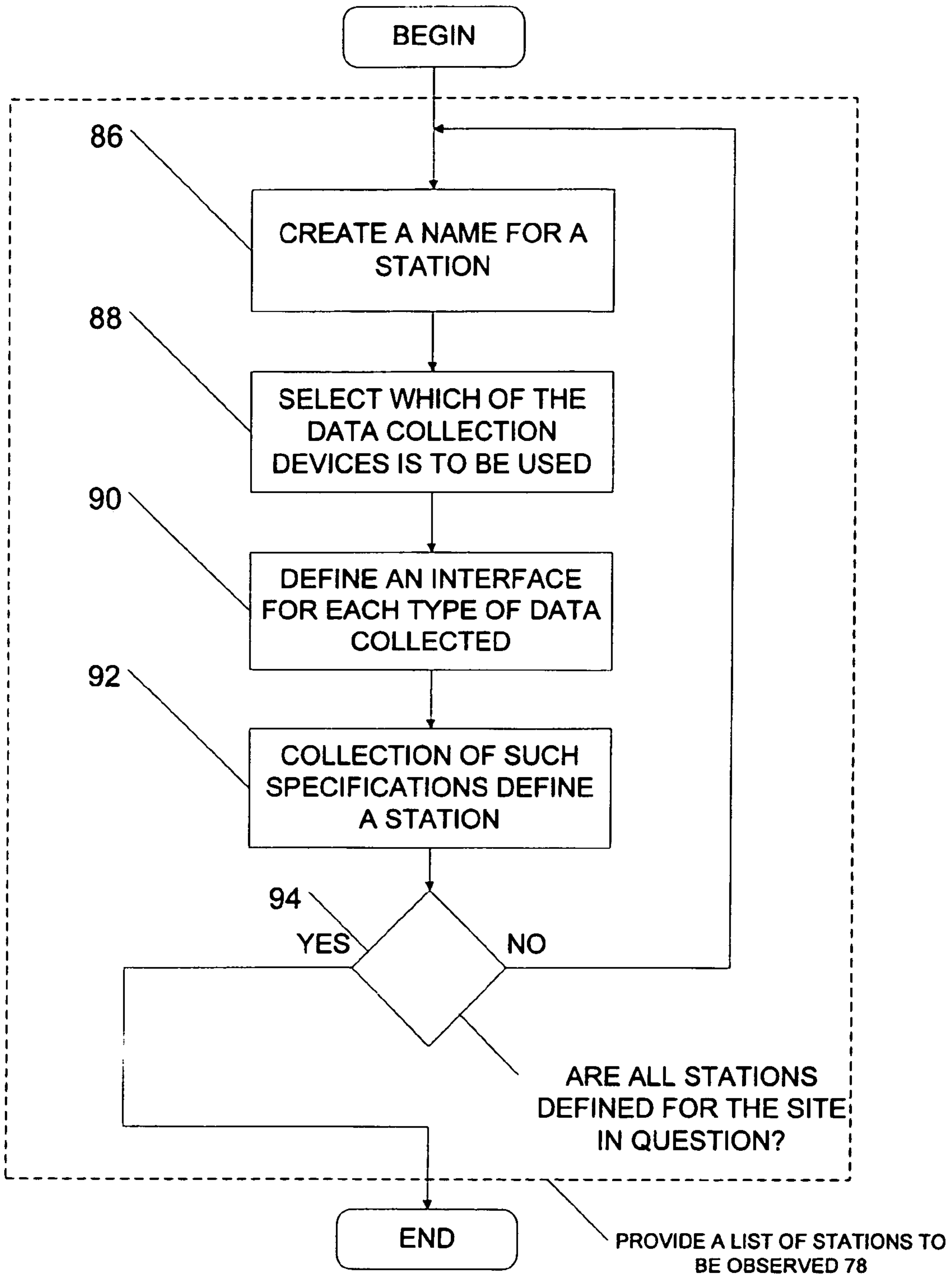
FIG. 7 is a flowchart showing an embodiment of a method for providing a list of stations for the site type and service type to be observed.

Now referring to FIG. 7, there is shown how the list of stations for the site type and service type to be defined is provided. The list of stations to be observed is preferably provided at one time at the setup of a survey.

According to step 86, a name is created for a station.

According to step 88, a selection is performed to select which of the data collection devices is to be used. In one embodiment the selection is performed by the operator at the remote inspection managing/scheduling unit 16 according to a remote site to inspect. As mentioned earlier, such step if performed once at setup of the survey.

According to step 90, an interface is defined for each type of data collected. In one embodiment, the interface is defined by an operator at the remote inspection managing/scheduling unit 16.

According to step 92, the collection of such specification defines a station. It should be appreciated that a plurality of stations may already be defined and stored in a memory unit at the remote inspection managing/scheduling unit 16 or elsewhere.

According to step 94, a check is performed by the operator designing the survey in order to find out if all important stations for the customer are covered (i.e. if all stations have been defined) for the site in question. The check is performed by an operator at the remote inspection managing/scheduling unit 16.

Now referring back to FIG. 6 and according to step 80, a survey that incorporates at least one of the stations from the sites to be observed is provided.

Figure 8:
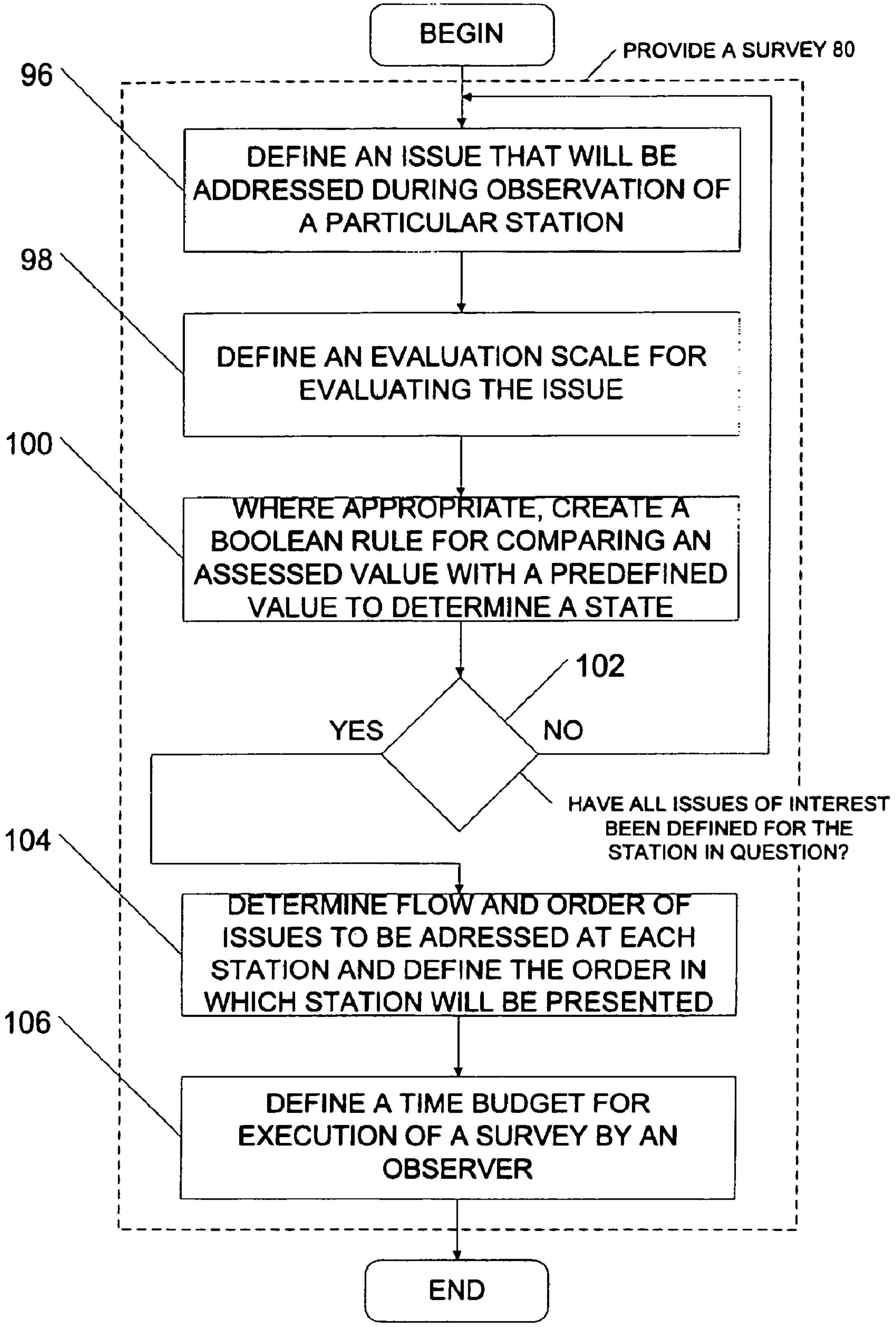
FIG. 8 is a flowchart showing an embodiment of a method for providing a survey.

Referring to FIG. 8, there is shown how a survey is provided.

According to step 96, an issue that will be addressed during observation of a particular station is defined. It should be understood that the issue is not limited to a given type of issue and should not construed to be limited to a statistical parameter such as a waiting time in a fast food or a freezer temperature value.

According to step 98, an evaluation scale (or methodology) is defined for evaluating the issue. The evaluation scale may be of any type and depends on the type of issue.

In the case where this is appropriate, a Boolean rule for comparing an assessed value with a predefined value to define a state is created according to step 100.

According to step 102, a check is performed in order to find out if all issues of interest have been defined for the station in question. Such check is performed by the designer of a survey by asking a customer if everything is covered.

In the case where not all the issues of interest have been defined for the station in question and according to step 96, another issue that will be addressed during observation of a particular station is defined according to step 96.

In the case where all the issues of interest have been defined for the station in question and according to step 104, a flow and order of issues to be addressed at each station is defined together with an order for presenting each station. The flow and order of issues to be addressed at each station is defined by an operator of the remote inspection managing/scheduling unit 16 at a one time upfront activity.

According to step 106, a time budget is defined for the execution of a survey by an observer. It should be understood a parameter may advantageously be defined for the execution of a survey in order to provide an efficient cost control of the remote inspection.

Now referring back to FIG. 5 and according to step 70, the at least one tour is allocated to an operator. It will be appreciated that the allocation of at least one tour to an operator may be performed according to various criteria such as at least one of a frequency-based criterion, a resource availability-based criterion and a resource cost-based criterion.

Figure 9:
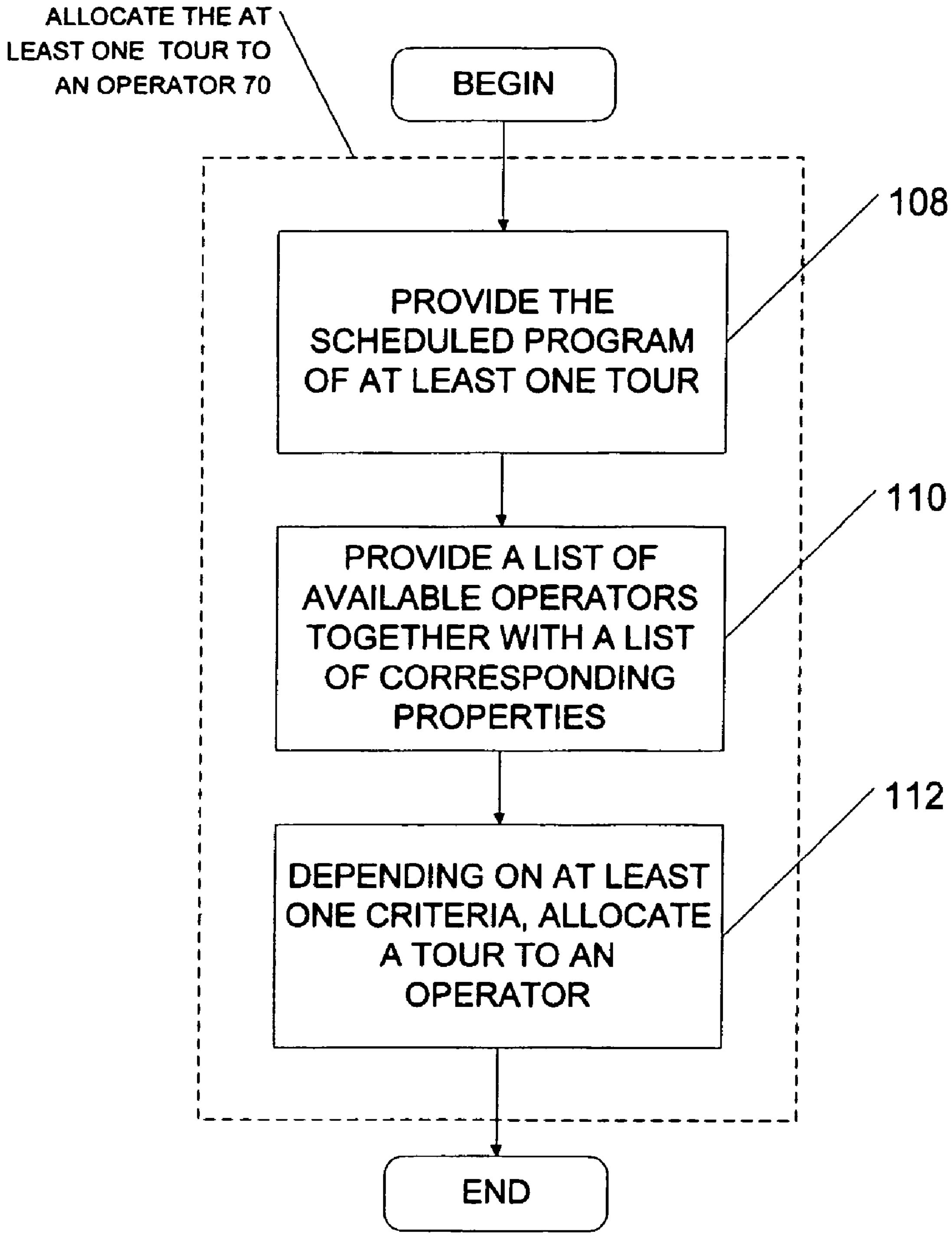
FIG. 9 is a flowchart showing an embodiment of a method for allocating a tour to at least one operator.

Now referring to FIG. 9, there is shown how the at least one tour is allocated to an operator 70.

According to step 108, the scheduled program of at least one tour is provided.

According to step 110, a list of available operators is provided together with a list of corresponding properties. In a first embodiment, the list of available operators is provided from a remote location on a network 12 while in a second embodiment the list of available operators is provided at the remote inspection managing/scheduling unit 16. A corresponding property may be an availability, a cost, etc.

According to step 112, a tour is allocated to an operator depending on at least one criteria. In one embodiment, the tour is allocated by an operator at the remote inspection/managing scheduling unit 16 while in another embodiment, the tour is allocated automatically at the remote inspection/managing scheduling unit 16. The allocation may be performed based on various criteria such as time-based criteria, resource cost-based criteria or the like.

Now referring back to FIG. 5 and according to step 72, the allocated tour is transmitted to an operator at a remote inspection unit 14. As explained above, the allocated tour is preferably transmitted using email.

According to step 74, a user interface is generated using the transmitted information. The user interface is generated using the display unit 26 of the remote inspection unit 14.

Figure 10:
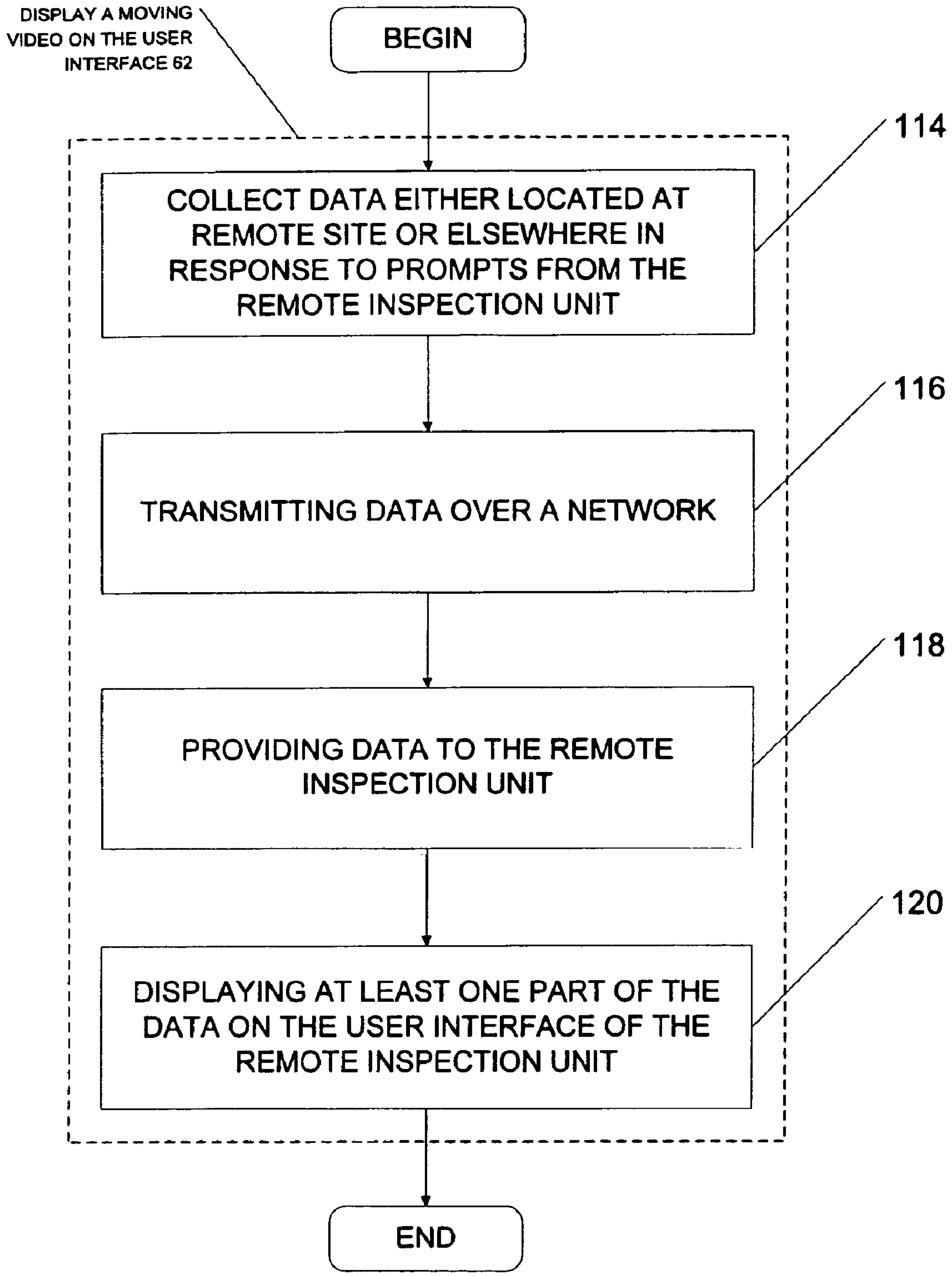
FIG. 10 is a flowchart showing an embodiment of a method for displaying a moving video on the user interface of the remote inspection unit.

Now referring to FIG. 10, there is shown how a moving video is displayed on the user interface.

According to step 114, data is collected either live from the remote site or from a data storing unit (either located at the remote site or at some other remote location on the network) in response to prompts from the remote inspection unit 14.

According to step 116, the data is transmitted over the network 12.

According to step 118, the data is provided to the remote inspection unit 14.

According to step 120, at least one part of the data is displayed on the user interface of the remote inspection unit 14.

Figure 11:
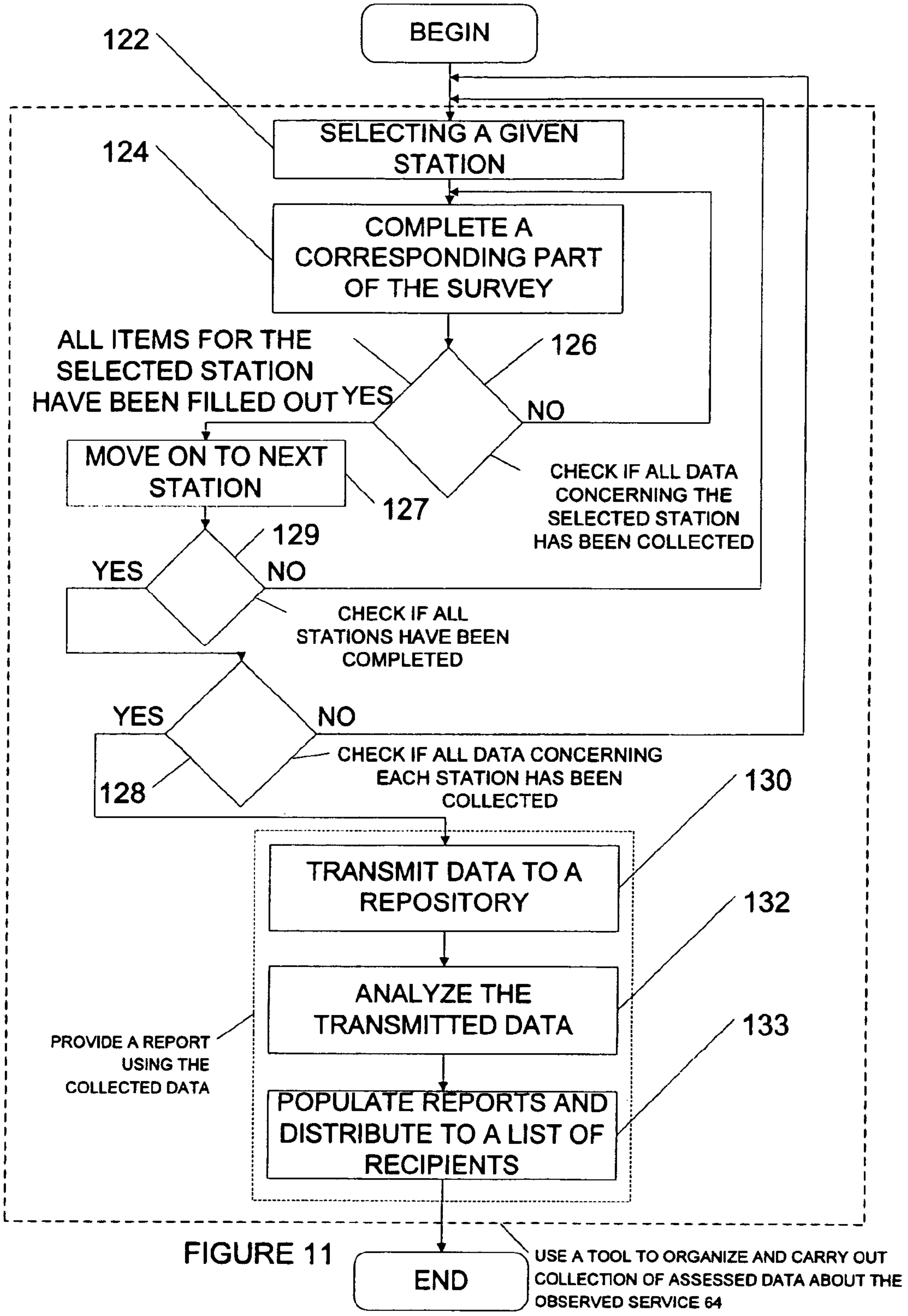
FIG. 11 is a flowchart showing an embodiment of a method for using a tool to organize and carry out collection of assessed data about an observed service.

Now referring to FIG. 11, there is shown how a tool is used to organize and carry out the collection of assessment data about the observed service.

According to step 122, a given station is selected. The given station is preferably selected by the operator of the remote inspection unit 14. In one embodiment, however, the order of stations to be visited during a survey is dictated by the survey structure.

According to step 124, a corresponding part of the survey is completed. It should be appreciated that while the corresponding part of the survey may be completed by the operator, a part of the survey may be completed automatically using data contained in the data signal received from the remote site inspection apparatus 10, or using the Boolean rule for comparing an assessed value with at least one of a predefined value to determine a state as described above.

According to step 126, a check is performed to find out if all items for the selected station have been filed out. In one embodiment, the check is performed by the operator of the remote inspection unit 14 while in another embodiment, the check is performed automatically depending on the amount of items that have been filled out.

In the case where not all the items for the selected station have been filed out and according to step 124, a corresponding part of the survey has still to be completed.

In the case where all the items for the selected station have been filed out and according to step 127, a move to next station is performed.

According to step 129, a check is performed in order to find out if all stations have been completed. In one embodiment, the check is performed by the operator of the remote inspection unit 14 while in another embodiment, the check is performed automatically depending on the amount of items that have been filled out.

In the case where all stations have been completed and according to step 128, a check is performed in order to find out if all data concerning each station has been collected. In one embodiment, the check is performed by the operator of the remote inspection unit 14 while in another embodiment, the check is performed automatically.

In the case where not all data concerning each station has been collected and according to step 122, a given station is selected.

In the case where all data concerning each station has been collected and according to step 130, the data is transmitted to a repository. The repository may be the memory unit 22 or any type of memory unit located outside the remote inspection unit 14 for the purposes of efficient storage and/or reporting.

According to step 132, the transmitted data is analyzed. It will be appreciated that while preferably the transmitted data is analyzed by the remote inspection managing/scheduling unit 16, the transmitted data may be analyzed at any other location on the network 12.

According to step 133, reports are populated and distributed to a list of recipients.

Figure 12:
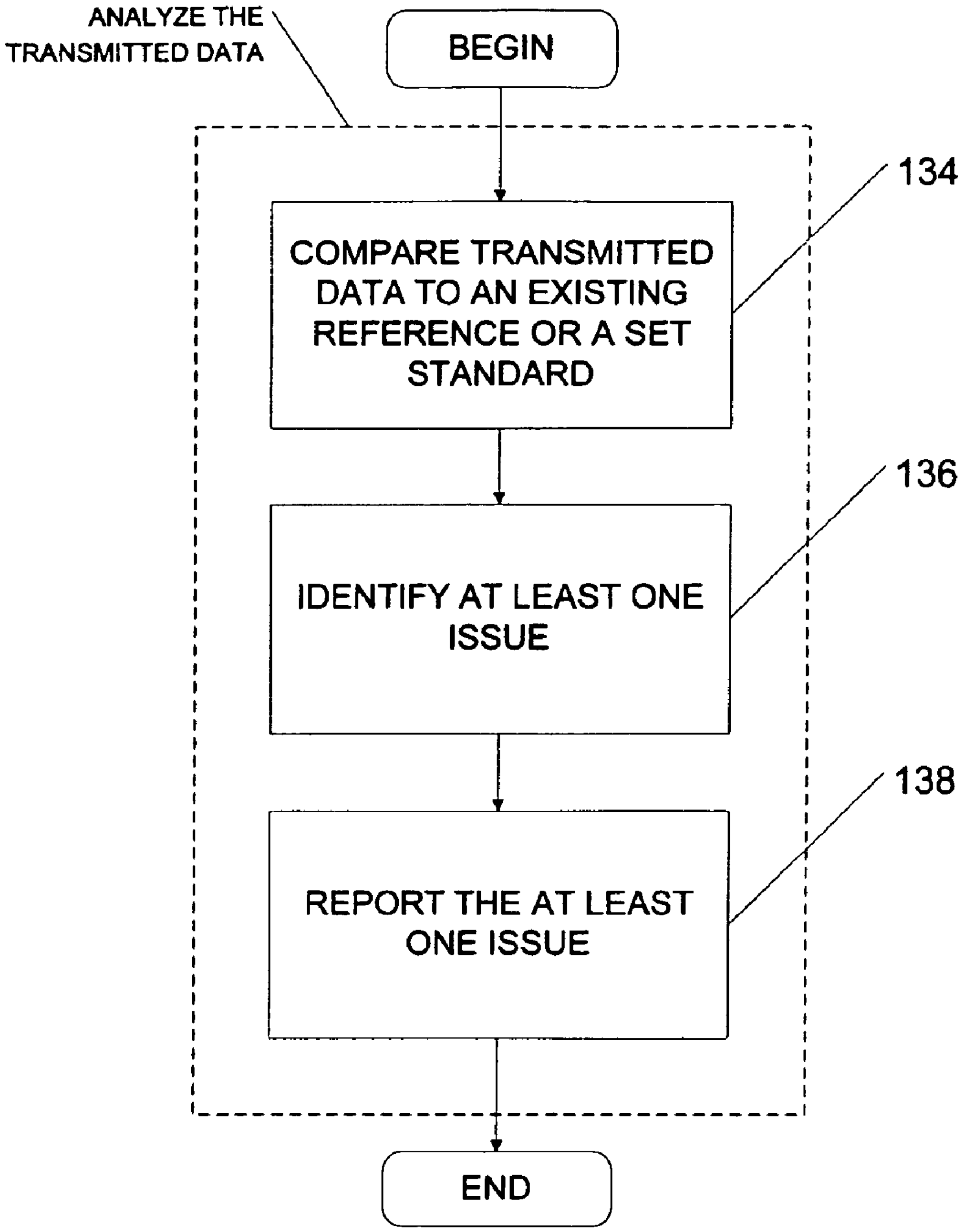
FIG. 12 is a flowchart showing an embodiment of a method for generating a report using collected data.

Now referring to FIG. 12, there is shown how a report is generated. It will be appreciated that the transmitted data is analyzed in order to provide a report which will be indicative of the result of the assessment of the service provided at the remote facility.

According to step 134, the transmitted data is compared to an existing reference or a set standard. Such comparing permits the determination of the state of an observed activity, person, object or station. It should be appreciated by the skilled addressee that a past transmitted data as well as a past report may be used as a reference for generating a present report.

According to step 136, at least one issue (of interest) is identified. The skilled addressee will appreciate that an issue is situation-specific and may depend on various parameters which will not be discussed here for clarity sake.

According to step 138, the identified at least one issue is reported. It should be understood that the issue may be reported to at least one third party using various means such as files, faxes, emails, paper reports, etc. It should be appreciated that, in one embodiment, the at least one third party may have access to the at least one part of the data signal transmitted to the remote inspection unit 14 in order to have an evidence of an element located in the report. It will be further appreciated that based on data reported and the at least one issue identified, at least one pre-specified report format may be selected and the selected report may be populated with relevant data. Furthermore it should be appreciated that the at least one person to whom report(s) are to be sent may be selected based on data reported and on the at least one issue identified.

Figure 13:
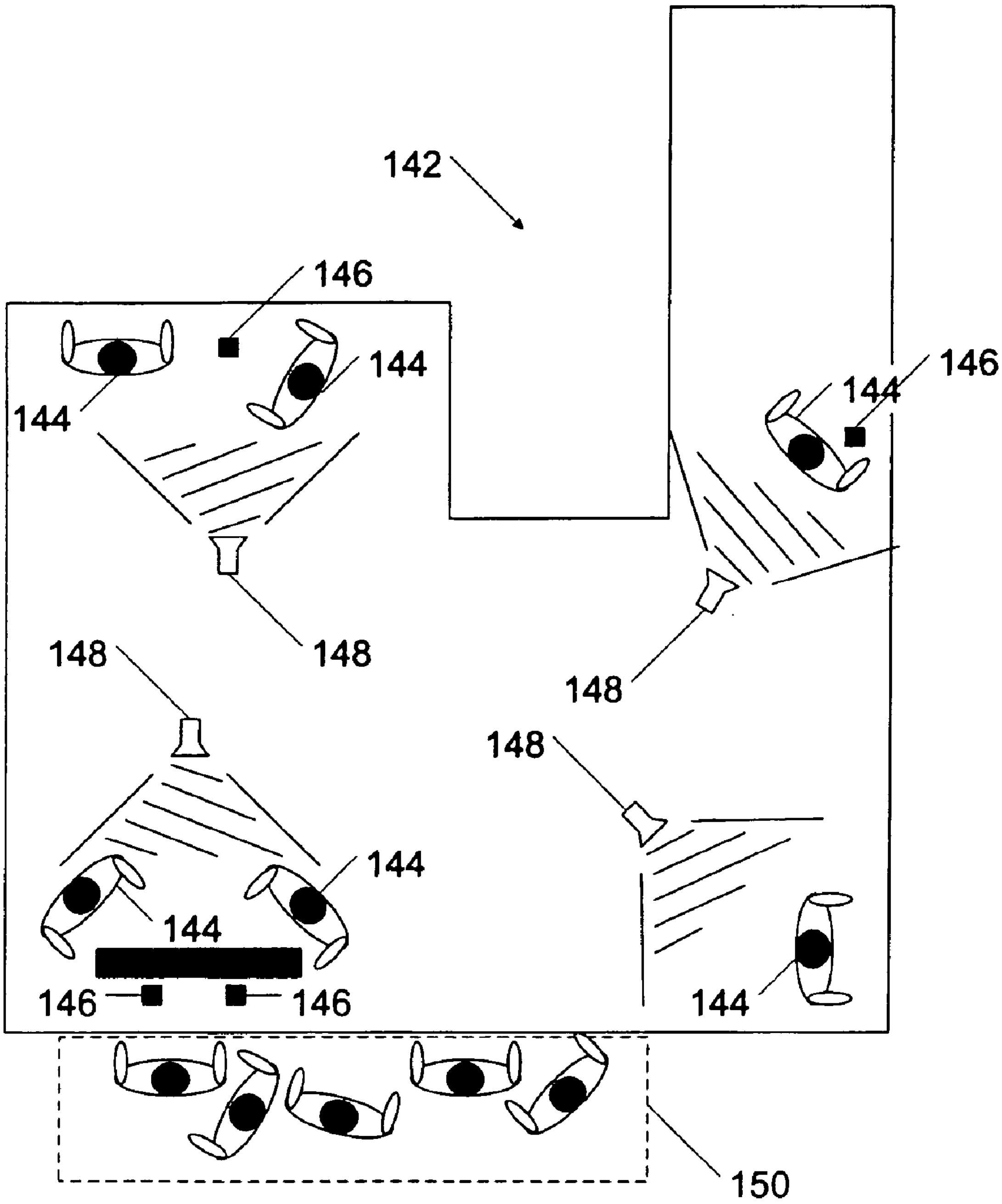
FIG. 13 is a top plan view of a floor plan showing an example of a remote site to be inspected.

Now referring to FIG. 13, there is shown a top plan view of a floor plan showing an example of a remote site 142 in which an inspection is performed.

Each station is monitored using at least one of a video capturing unit 148 and a sensor unit 146. Each video capturing unit 148 is used to monitor at least one individual 144.

In the embodiment disclosed, the remote site 142 comprises four stations.

It will be appreciated that the remote site 142 may be at location comprising a plurality of customers 144 such as a fast food restaurant or the like. In such case, the items to check may comprise at least one of an employee behavior, quality of delivered customer service, quality of food preparation, cleanliness of various areas, etc.

It will be appreciated that a remote inspection may be attended or unattended. An unattended tour enables a single operator to observe the same kind of work activities at multiple locations by using a time shift mechanism.

Figure 14:
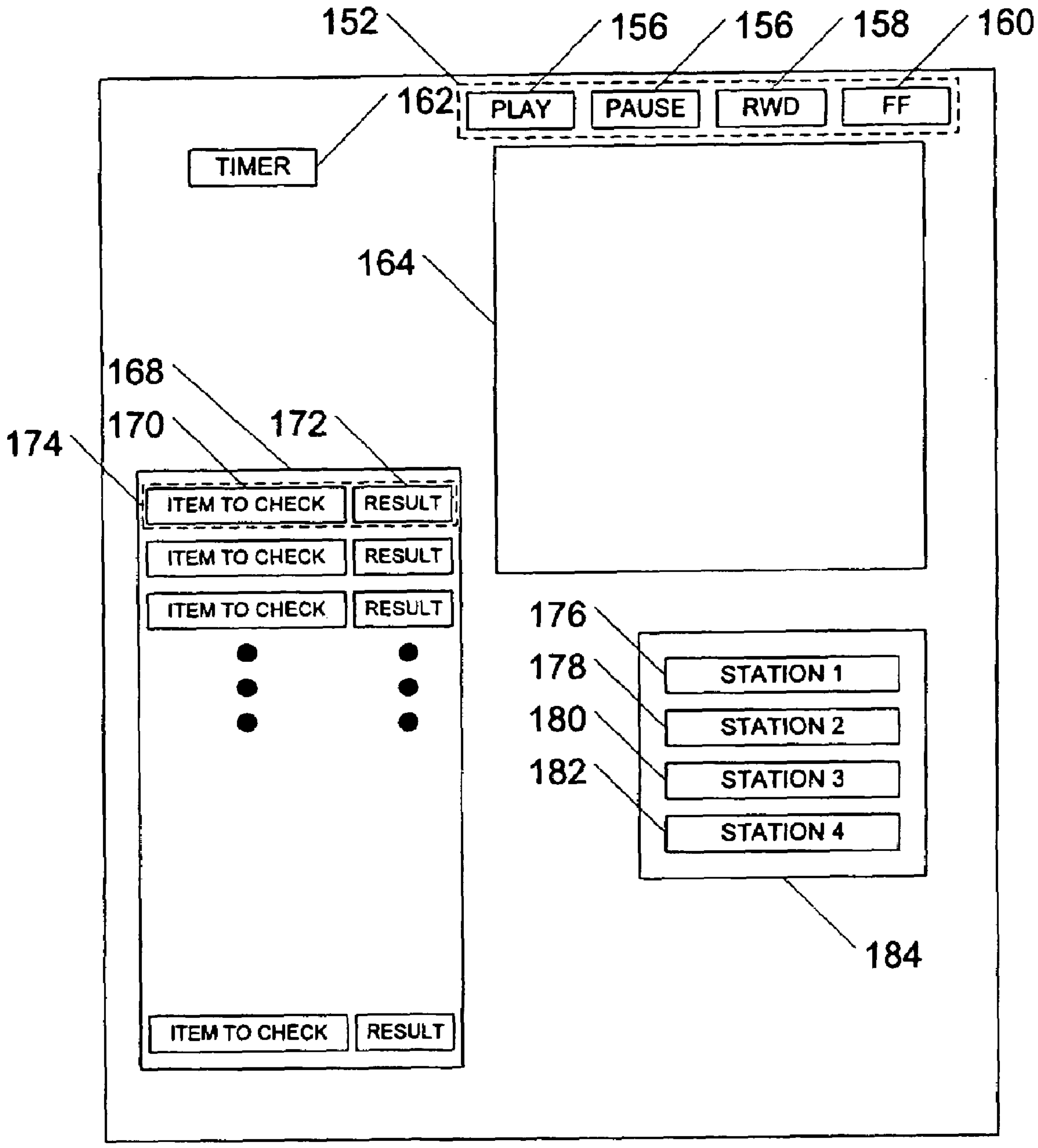
FIG. 14 is a schematic diagram showing an example of a user interface.

Now referring to FIG. 14, there is shown a screenshot of an example of the user interface displayed by the display unit 26. The user interface comprises a video window 164 for displaying a video signal, a tool for collecting data indicative of a service 168, at least one timer 162, a station selection unit 184 and a plurality of navigation buttons 152.

The tool for collecting data indicative of a service 168 displays a list of at least one element 174. Each of the elements 174 comprises at least an item to check 170 and a corresponding result 172.

The operator watches a video displayed in the video window 102 and looks for the at least one item to check 170. In accordance with the display in the video window 164, an operator's assessment is entered for each of the items to check. The operator's assessment may be provided in a binary format (i.e. yes or no); alternatively, the result may be entered by selecting an item in a scale rated (e.g. from excellent to very poor; alternatively a numerical value (such as a count or a timer) may be entered. In one embodiment, results are entered by the operator. Alternatively, results could be generated automatically according to a) specific electronic data received from the remote sensors, b) one or more timers activated by the operator in response to activity observed in the video, c) a Boolean rule for comparing an assessed value with at least one of a predefined value to determine a state of at least one of an observed activity, or d) at least one specific detection algorithm, such algorithm based on various principles such as machine vision, statistical analysis of data, etc. It will be also appreciated that the list of items to check may be modified dynamically according to previous entries provided by the operator. Such modifications may comprise, among others, a) "default answers" which do not require the operator to enter an assessment unless his assessment is different than the default answer, b) "pop-up boxes" which are presented to the operator in the event of certain pre-specified responses in order to prompt that operator to expand on his response in specific ways (and with that additional response being able to be treated as a separate piece of data that can be reported upon individually, and c) "bypassable sections" which include a series of additional questions that are held in reserve and only presented to the operator in the event that certain conditions pertain during a tour, otherwise they are "bypassed". The skilled addressee will appreciate that such a list is preferably provided in a tree-structured manner in order to enable the provision of situation-specific questions. It will be further appreciated that the user interface may also provide tools to enable the operator to rapidly request the display of detailed information related to the work or service policies that pertain at the site under observation in order to facilitate the completion of an assessment 172 of an item to check 170. It should also be appreciated that the user interface may also enable the operator to utilize "bookmarks" to identify during the viewing of live video a specific segment of the video (by its time stamp) which contains material which requires greater attention at a later time, particularly when a live video feed has been terminated and the operator can pause and rewind the video in order to more closely observe activity in order to make a more subtle assessment. Each "bookmark" maintains an association between a station inspection criteria, whatever observed data result is entered by the inspector at the time of establishing the bookmark, comments appended to the result, and a link to the specific segment of recorded audio and video.

The station selection unit 184 is adapted for selecting one of a plurality of stations available. In the example disclosed in FIG. 9, the station selection unit 184 comprises a button 176 for selecting "station 1", a button 178 for selecting "station 2", a button 180 for selecting "station 3", and a button 182 for selecting "station 4".

The timer 162 is adapted for providing a temporal indication of the elapsed time associated with events observed in a video for each of the selected stations, often where the assessment to be made involves time/motion attributes of the service performance. It will be appreciated that the user interface may provide for more than one timer 162 to run simultaneously to enable the operator to generate the elapsed time associated with several concurrent observed activities which take place either within a single station (eg. multiple customers at different stages of being served at the front counter), or while an operator switches from one given station to another given station (eg. the operator is measuring the elapsed time associated with a longer operation at one station while simultaneously measuring the elapsed time associated with several short operations at a different station. The skilled addressee will appreciate that it is therefore possible to observe and assess more than one station in parallel or more than one person in each station simultaneously.

The plurality of navigation buttons 152 is adapted for enabling the operator to navigate through a video. In the embodiment disclosed in FIG. 14, the plurality of navigation buttons 152 comprises a "play" button 156, a "pause" button 157, a "rewind" button 158 and a "fastforward" button 160. The skilled addressee will appreciate that the embodiment disclosed in FIG. 14 is exemplary only and that buttons may be added or subtracted. For instance, it may be possible to select between a live video source or a stored video source.

The skilled addressee will appreciate that in another embodiment, the input/output unit 30 may be used to control remotely at least one video capturing unit 48 in order to capture a specific view in the case where the video capturing unit 48 comprises a pan-tilt-zoom control (PTZ).

The user interface may further comprise a tool for enabling at least one of storage, manipulation, distribution, management, deletion and transmission of at least one part of the data related to the inspection when the data is sent to the central repository.

While illustrated in the block diagrams as groups of discrete components communicating with each other via distinct data signal connections, it will be understood by those skilled in the art that the embodiments herein are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetical signal.

The embodiment(s) of the invention described above is (are) intended to be exemplary only. The scope of the invention is therefore intended to be limited solely by the scope of the appended claims.

We claim:

1. A method for performing an evaluation of the quality of performance of a service involving a person at a remote facility comprising a plurality of stations, said method comprising:

providing a user interface, said providing comprising receiving data indicative of said user interface, said data comprising a program of at least one tour of at least one station of said remote facility, said program generated by a remote host from a list comprising programs for a plurality of remote sites to be evaluated, said providing further comprising generating said user interface using said data, said generating of said at least one tour comprising providing a list of selected stations at said remote facility and providing a survey that incorporates at least one station from said list of stations; wherein said providing of said list of selected stations comprises, for each selected station, selecting data collection device and defining an interface depending on the selected data collection device;

viewing, on said user interface, a moving video representative of a station showing said person; and using a tool displayed on said user interface, said tool for collecting data regarding the quality of performance of a service in accordance with said video.

2. The method as claimed in claim 1, wherein said data indicative of said user interface is received from said remote host on a network.

3. The method as claimed in claim 2, wherein said network comprises at least one of a Local Area Network (LAN) and a Wide Area Network (WAN).

4. The method as claimed in claim 1, wherein said data indicative of said user interface is received from said remote host on a network in response to an allocation by an operator to perform said evaluation.

5. The method as claimed in claim 4, wherein said allocation is performed based on at least one criteria.

6. The method as claimed in claim 5, wherein said at least one criteria comprises at least one of a time-based criterion, a frequency-based criterion, a resource availability-based criterion, and a resource cost-based criterion.

7. The method as claimed in claim 1, wherein said data collection device comprises at least one of video cameras/sensors, audio sensors, thermal sensors, proximity sensors, motion sensors, weight sensors, and relays which produce signals based on inputs received from third-party computer devices.

8. A method for performing an evaluation of the quality of performance of a service involving a person at a remote facility comprising a plurality of stations, said method comprising:

providing a user interface, said providing comprising receiving data indicative of said user interface, said data comprising a program of at least one tour of at least one station of said remote facility, said program generated by a remote host from a list comprising programs for a plurality of remote sites to be evaluated, said providing further comprising generating said user interface using said data, said generating of said at least one tour comprising providing a list of selected stations at said remote facility and providing a survey that incorporates at least one station from said list of stations, wherein said providing of said survey comprises defining an issue to be evaluated during an observation of one of said selected stations and defining at least one of an evaluation scale and a methodology for evaluating said issue;

viewing, on said user interface, a moving video representative of a station showing said person; and using a tool displayed on said user interface, said tool for collecting data regarding the quality of performance of a service in accordance with said video.

9. The method as claimed in claim 8, further comprising creating a Boolean rule for comparing an assessed value with at least one of a predefined value to determine a state of at least one of an observed activity, a person, an object and a station.

10. The method as claimed in claim 8, further comprising defining an order for performing an inspection.

11. The method as claimed in claim 8, wherein said providing of said survey further comprises defining at least one of a time-based and a resource cost-based budget for performing said evaluation.

12. The method as claimed in claim 8, wherein said moving video is provided from said remote facility.

13. The method as claimed in claim 12, wherein said moving video is provided live from said remote facility.

14. The method as claimed in claim 12, wherein said moving video is provided from a video storing unit located on said remote facility.

15. The method as claimed in claim 8, wherein said moving video is provided from a remote storage location on a network.

16. The method as claimed in claim 8, wherein said network is at least one of a local area network (LAN) and a wide area network (WAN).

17. A method for performing an evaluation of the quality of performance of a service involving a person at a remote facility, said method comprising: providing a user interface; viewing, on said user interface, a moving video representative of a station showing said person; using a tool displayed on said user interface, said tool for collecting data regarding the quality of performance of a service in accordance with said video, said using of said tool displayed on said user interface comprises selecting a given station and completing a corresponding survey for said given station to provide said data regarding the quality of performance of said service at the remote facility; transmitting at least one part of said data regarding said quality of performance of said service to a remote location; and analyzing the transmitted data; wherein a plurality of stations are evaluated, each of said plurality of stations involving at least one person, wherein said analyzing of said transmitted data comprises comparing at least one part of said transmitted data with at least one of a reference and a standard to identify at least one issue of interest.

18. The method as claimed in claim 17, further comprising reporting the identified at least one issue to at least one third party.

19. The method as claimed in claim 17, wherein said reporting comprises providing data related to said identified issue.

* * * * *